United States Patent [19]
Ohtake

[11] Patent Number: 5,499,141
[45] Date of Patent: Mar. 12, 1996

[54] ZOOM LENS

[75] Inventor: Motoyuki Ohtake, Ohmiya, Japan

[73] Assignee: Nikon Corporation, Tokyo, Japan

[21] Appl. No.: 302,473

[22] Filed: Sep. 12, 1994

[30] Foreign Application Priority Data

Sep. 22, 1993 [JP] Japan ................................ 5-259373
Sep. 22, 1993 [JP] Japan ................................ 5-259374

[51] Int. Cl.$^6$ ................................................. G02B 15/14
[52] U.S. Cl. ................................................ 359/684; 359/676
[58] Field of Search ................................... 359/676, 680, 359/681, 682, 683, 684, 685

[56] References Cited

U.S. PATENT DOCUMENTS 5,325,233  6/1994  Nakatsuji et al. .................. 359/684

FOREIGN PATENT DOCUMENTS 60-57814   4/1985   Japan.
2-256015   10/1990  Japan.
3-39920    2/1991   Japan.
4-338910   11/1992  Japan.

Primary Examiner—Georgia Y. Epps
Assistant Examiner—Dawn-Marie Bey
Attorney, Agent, or Firm—Shapiro and Shapiro

[57] ABSTRACT

The zoom lens of the present invention comprises, in the order from the object side, a first lens group having a positive refractive power, a second lens group having a negative refractive power, a third lens group having a negative refractive power, a fourth lens group having a positive refractive power and a fifth lens group having a negative refractive power, in which, at a refractive power varying operation from the wide angle end to the telescopic end, at least the first and fifth lens groups move toward the object side, while the air gaps between the first and second lens groups and between the second and third lens groups increase and the air gap between the fourth and fifth lens groups decreases, and there is satisfied a condition:

$$0.4 < \Delta Bf/(ft-fw) < 0.8$$

wherein $\Delta Bf$ is the amount of axial movement of the fifth lens group at the refractive power varying operation from the wide angle end to the telescopic end, and $fw$ and $ft$ are focal length of the entire lens system respectively at the wide angle end and at the telescopic end.

15 Claims, 6 Drawing Sheets

ZOOM LENS

BACKGROUND OF THE INVENTION

1. Field of the Invention

The present invention relates to a zoom lens.

2. Related Background Art

In recent years, zoom lens is principally adopted as the phototaking lens for the camera with lens shutter.

With the improvement in the performance of zoom lens, there have been proposed zoom lenses of various types. Also with the recent progress in the barrel technology, there have been proposed so-called multi-group zoom lenses achieving a larger zoom ratio, composed of three or more movable lens groups. Along with such trend, there have also been proposed various focusing systems for such multi-group zoom lenses.

At first there will be given general explanation on so-called multi-group zoom lens, having three or more movable lens groups.

In such zoom lens with multiple lens groups, the zooming trajectories of the lens groups involved in the refractive power varying operation from the wide angle end to the telescopic end have a larger freedom of selection, so that the freedom for correction of aberrations also increases. Also the increase in the number of lens groups involved in the refractive power varying operation allows to uniformly distribute the burden of such refractive power variation among the lens groups, so that it becomes possible to attain higher performance while achieving a larger zooming ratio. Such zoom lens has been associated with a difficulty of complication in the barrel structure resulting from the increase in the number of movable parts, but such difficulty has been overcome to a certain extent by the recent progress in the barrel technology.

In the zoom lens without limitation in the back focus, it has been customary to employ a negative lens group at the position closest to the image side in order to reduce the length of the entire lens system and to reduce the diameters of the component lenses, and, in such lens, the refractive power varying operation, from the wide angle end to the telescopic end, has been effectively achieved by increasing the change in the back focus.

It is desirable also to employ a positive lens group closest, in the entire lens system, to the object side in order to reduce the length of the entire lens system at the telescopic end, and to position said positive lens group as closely as possible to the film plane at the wide angle end, in order to reduce the effective diameter of the frontmost lens component.

Based on these facts, a positive-positive-negative three-group zoom lens and a positive-negative-positive-negative four-group zoom lens have been raised as the specific configurations of such multigroup zoom lens adapted for compactization and capable of achieving a large zooming ratio, and various proposals have been made on these configurations.

The positive-positive-negative three-group zoom lens is composed, in the order from the object side, of a first lens group having a positive refractive power, a second lens group having a positive refractive power and a third lens group having a negative refractive power, and is so constructed that, at the refractive power varying operation from the wide angle end to the telescopic end, the air gap between said second and third lens groups decreases while the air gap between said first and second lens group increases. The positive-positive-negative three-group zoom lens of such configuration is disclosed, for example, in the Japanese Patent Application Laid-open No. 2-256015.

In the zoom lens disclosed in the above-mentioned patent application, a major portion of the effect of the refractive power variation is borne by the third lens group. For this reason, in a design for a larger zooming ratio, there will result a large variation in the off-axial aberrations generated in the third lens group, at the refractive power varying operation from the wide angle end to the telescopic end.

On the other hand, the second lens group is composed of a lens group 2a having a negative refractive power at the object side and a lens group 2b having a positive refractive power at the image side. Consequently the above-mentioned variation in the aberrations resulting from the refractive power varying operation can be suppressed to a certain extent, either by increasing the number of lens components constituting the second lens group or by selecting a sufficiently large axial distance between said lens groups 2a and 2b. Such solutions, however, are difficult to achieve the reduction in the number of component lenses or the simplification of the configuration, and are generally against compactization.

The positive-negative-positive-negative four-group zoom lens is composed, as disclosed for example in the Japanese Patent Application Laid-open No. 60-57814, in the order from the object side, of a first lens group having a positive refractive power, a second lens group having a negative refractive power, a third lens group having a positive refractive power and a fourth lens group having a negative refractive power, and is so constructed that, at the refractive power varying operation from the wide angle end to the telescopic end, the air gap between said first and second lens groups increases while that between said third and fourth lens group decreases.

In the zoom lens disclosed in the above-mentioned patent application, the length of the entire lens system at the telescopic end is reduced by selecting the refractive power of the first lens group larger, in the positive side, than the refractive power of the entire lens system at the telescopic end, and selecting the second to fourth lens groups in such a manner that the synthesized refractive power thereof becomes negative at the telescopic end.

However, in the above-mentioned zoom lens, the second lens group has, at the wide angle end, a magnification $\beta 2$ at use, approaching a relation $1/\beta 2 \cong 0$, indicating that the synthesized refractive force of the first and second lens groups is almost zero. For this reason, in case of designing for a wider image angle, there cannot be obtained a sufficiently large back focus and the effective diameter of the rear lens components becomes inevitably larger.

Also the above-mentioned zoom lens can achieve a larger zoom ratio, in comparison with the positive-positive-negative three-group zoom lens, by making a large change in the air gap between the second and third lens groups at the refractive power varying operation from the wide angle end to the telescopic end, thereby causing said first to third lens groups to participate in the refractive power varying operation. However, if the compactization of the lens system is intended at the same time, it becomes difficult to satisfactorily suppress the variation in the off-axial aberrations generated in the second lens group, because the off-axial rays passing said second lens group does not vary much in the height but varies significantly in the incident angle at the refractive power varying operation.

As explained in the foregoing, in the conventional positive-positive-negative three-group zoom lens or positivenegative-positive-negative four-group zoom lens, it has been difficult to achieve higher performance in the imaging characteristics while attaining compactization and a larger zoom ratio. Also in case of designing for a larger zoom ratio with a limited number of component lenses, each of the lens groups has a larger burden in the refractive power varying operation, so that it has been difficult to satisfactorily correct the variations in the aberrations, generated in the refractive power varying operation from the wide angle end to the telescopic end.

In the following there will be explained the focusing method in the multigroup zoom lens.

In general, the focusing lens group is required to have a smaller amount of movement and a smaller weight, because a smaller amount of movement can lead to the compactization of the entire lens system, while a smaller lens weight allows to simplify the lens driving mechanism.

For focusing to a short-distance object in the multigroup zoom lens, various proposals have been made in the following three methods:

(A) single lens group moving method;

(B) IF (inner focusing) method;

(C) RF (rear focusing) method.

In the multigroup zoom lens without limitation in the back focus, as represented by the conventional positive-positive-negative three-group zoom lens or positive-negative-positive-negative four-group zoom lens, a positive lens group is provided closest to the object side within the lens system (from a lens face closest to the object side to a lens closest to the image side), but said positive lens group is given a weak positive refractive power in order to satisfactorily correct the positive distortion generated at the wide angle end. Consequently the amount of movement becomes large in case of focusing with the method (A) by single lens movement.

Also as the back focus at the wide angle end is relatively small, the negative lens group closest to the image side has a lens diameter larger than that in other lens groups and bears a large proportion in the refractive power varying operation. For this reason, said negative lens group requires at least two or more lenses, so that the focusing lens group becomes heavy in case of focusing with the rear focusing method (C).

The inner focusing method (B), in case of the positive-positive-negative three-group zoom lens, is achieved, as disclosed in the Japanese Patent Application Laid-open No. 4-338910, by dividing the second lens group into two and moving a lens group at the object side toward the object side. However, the focusing group becomes undesirably heavy because the focusing group contains an increased number of lenses.

In case of the positive-negative-positive-negative four-group zoom lens, the second lens group shows a large variation in the magnification of use at the refractive power varying operation, as disclosed for example in the Japanese Patent Application Laid-open No. 3-39920. For this reason, the number of component lenses has to be increased in order to suppress the variation in the aberrations at the focusing operation, while suppressing also the variation in the aberration at the refractive power varying operation, and the focusing group therefor becomes undesirably heavy.

Besides, the conventional multigroup zoom lenses have not been satisfactory in reducing the amount of work (weight×amount of movement) at the focusing operation.

SUMMARY OF THE INVENTION

An object of the present invention is to provide a multigroup zoom lens capable, with a limited number of component lenses, of providing excellent imaging characteristics and achieving a larger zoom ratio.

Another object of the present invention is to provide a multigroup zoom lens featured by a sufficiently small amount of work at the focusing operation and capable, with a limited number of component lenses, of providing excellent imaging characteristics and achieving a larger zoom ratio.

The above-mentioned objects can be attained, according to an aspect of the present invention, by a zoom lens which comprises, as shown in FIG. 1, in the order from the object side, a first lens group G1 having a positive refractive power, a second lens group G2 having a negative refractive power, a third lens group G3 having a negative refractive power, a fourth lens group G4 having a positive refractive power and a fifth lens group G5 having a negative refractive power, wherein, at a refractive power varying operation from the wide angle end to the telescopic end, at least said first and fifth lens groups G1, G5 move toward the object side, while the air gap between said first and second lens groups G1, G2 increases, that between said second and third lens groups G2, G3 increases also and that between said fourth and fifth lens groups G4, G5 decreases, said zoom lens further satisfying a condition:

$$0.4 < \Delta Bf/(ft-fw) < 0.8 \quad (1)$$

wherein $\Delta Bf$ is the amount of movement of said fifth lens group along the optical axis in the refractive power varying operation from the wide angle end to the telescopic end, and fw and ft are the focal lengths of the entire lens system respectively at the wide angle end and at the telescopic end.

Said zoom lens preferably satisfies further the following conditions:

$$0.6 \leq |f2|/f1 < 2.5 \quad (2)$$

$$0.1 < (d2,3t - d2,3w)/(d4,5w - d4,5t) < 0.8 \quad (3)$$

wherein f1 is the focal length of said first lens group G1; f2 is the focal length of said second lens group G2; d2,3w is the axial air gap between said second and third lens groups G2, G3 at the wide angle end; d2,3t is the axial air gap between said second and third lens groups G2, G3 at the telescopic end; d4,5w is the axial air gap between said fourth and fifth lens groups G4, G5 at the wide angle end; and d4,5t is the axial air gap between said fourth and fifth lens groups G4, G5 at the telescopic end.

Furthermore, the above-mentioned zoom lens preferably satisfies the following conditions:

$$0.8 < f1/(fw \cdot ft)^{1/2} < 1.4 \quad (4)$$

$$-0.4 < (f2-f3)/(f2+f3) < 0.8 \quad (5)$$

$$0.1 < f5/f2 < 0.7 \quad (6)$$

wherein f1 is the focal length of said first lens group G1; f2 is the focal length of said second lens group G2; f3 is the focal length of said third lens group G3; G5 is the focal length of said fifth lens group; and fw and ft are focallengths of the entire lens system respectively at the wide angle end and at the telescopic end.

Thus, the zoom lens of the present invention, according to an embodiment thereof, comprises, in the order from the object side, a first lens group G1 having a positive refractive power, a second lens group having a negative refractive power, a third lens group G3 having a negative refractive power, a fourth lens group G4 having a positive refractive power and a fifth lens group G5 having a negative refractive power, and is so constructed that, at a refractive power varying operation from the wide angle end to the telescopic end, at least said first and fifth lens groups G1, G5 move toward the object side, the air gap between said first and second lens groups G1, G2 increases while that between said second and third lens groups G2, G3 increases and that between said fourth and fifth lens groups G4, G5 decreases. In this manner there can be attained a zoom lens which is compact, is limited in the number of component lenses and is capable of achieving a larger zoom ratio.

A stop S is desirably provided about the middle of the lens system (from the lens face closest to the object side to the lens face closest to the image side), preferably between the second and third lens groups G2, G3, or between the third and fourth lens groups G3, G4 or between the fourth and fifth lens groups G4, G5.

The second and third lens groups G2, G3 of negative refractive forces are positioned, at the wide angle end, closer to the object side within the lens system, and the synthesized refractive force of the first to third lens groups is selected as negative, in order to satisfactorily correct the positive distortion aberration, thereby securing a sufficiently large back focus. Also a strong positive refractive force is obtained by selecting a relatively large air gap between the first to third lens groups, having a negative synthesized refractive force and the fourth lens group G4 of a positive refractive power.

On the other hand, for reducing the length of the entire lens system at the telescopic end, the air gaps between the first and second lens groups G1, G2 and between the second and third lens groups G2, G3 are widened to render the synthesized refractive force of the first to third lens groups weaker, in the negative side, than that at the wide angle end. Also the air gap between the fourth and fifth lens groups G4, G5 is made narrow.

As explained in the foregoing, in the zoom lens without limitation in the back focus, it is effective to position a negative lens group closest to the image side, in order to reduce the length of the entire lens system. Also in the present invention, therefore, the fifth lens group G5 closest to the image side has a negative refractive power. Also for attaining a wider image angle, the back focus at the wide angle end is made somewhat shorter in order to separate the off-axial ray, passing the fifth lens group G5, from the optical axis, and the axial ray and the off-axial ray are independently corrected in the fifth lens group G5.

Furthermore, the length of the entire lens system at the wide angle end is shortened to position the off-axial ray, passing the first lens group G1, closer to the optical axis, thereby enabling to reduce the effective diameter of the frontmost lens.

On the other hand, the back focus at the telescopic end is made larger to position the off-axial ray, passing the fifth lens group G5, closer to the optical axis than that at the wide angle end, whereby the height of the off-axial ray, passing the fifth lens group G5, has a larger variation in the refractive power varying operation. It is therefore rendered possible to satisfactorily suppress the variation in the off-axial aberrations generated in the fifth lens group G5 at the refractive power varying operation.

In the present invention, the synthesized refractive power of the first to third lens groups is always negative in the refractive power varying operation, and the axial distance between the principal point of the first lens group G1 and the synthesized principal point of the second and third lens groups G2, G3 increases in the course of the refractive power varying operation from the wide angle end to the telescopic end. A sufficiently large back focus can be obtained at the wide angle end, by positioning the second and third lens groups G2, G3 close to the first lens group G1 at the wide angle end. Also the effective diameter of the frontmost lens can be reduced, as the off-axial ray, passing the second and third lens groups G2, G3, comes closer to the optical axis. Furthermore, as the synthesized refractive force of the first to third lens groups becomes smaller in the negative side at the telescopic end, the diverging effect becomes weaker and the length of the entire lens system at the telescopic end is shortened.

In the following there will be explained the arrangement of refractive powers of the second lens group G2, the third lens group G3 and the fourth lens group G4, with reference to a system of thin lenses.

FIG. 2 shows the relative arrangement of the third and fourth lens groups G3, G4 relative to the second lens group G2, in the refractive force varying operation from the wide angle end to the telescopic end. For the purpose of simplicity, the air gap between the second and fourth lens groups G2, G4 is assumed to be constant.

More specifically, FIG. 2 shows the arrangement of the second to fourth lens groups respectively at the wide angle end (W) and at the telescopic end (T). As shown therein, the second and third lens groups G2, G3 are positioned together at the wide angle end, while the third and fourth lens groups G3, G4 are positioned together at the telescopic end.

The synthesized refractive power $\phi w$ of the second to fourth lens groups at the wide angle end can be represented by the following equation (a):

$$\phi w = (\phi 2 + \phi 3) + \phi 4 - (\phi 2 + \phi 3) \cdot \phi 4 \cdot d \qquad (a)$$

wherein $\phi 2$, $\phi 3$ and $\phi 4$ are the refractive powers respectively of the second, third and fourth lens groups, and d is the axial distance between the second and fourth lens groups G2, G4.

On the other hand, the synthesized refractive power $\phi t$ of the second to fourth lens groups at the telescopic end can be represented by the following equation (b):

$$\phi t = \phi 2 + (\phi 3 + \phi 4) - \phi 2 \cdot (\phi 3 + \phi 4) \cdot d \qquad (b)$$

Since $\phi 2 < 0$, $\phi 3 < 0$ and $\phi 4 > 0$, there stand following relations (c) and (d):

$$|\phi 2| < |\phi 2 + \phi 3| \qquad (c)$$

$$\phi 4 > (\phi 3 + \phi 4). \qquad (d)$$

Consequently, based on the second term of the relations (a) and (b), the relations (c) and (d) indicate that $\phi w$ is larger, in the positive side, than $\phi t$ and the contribution to the refractive power varying operation.

In the following each of the foregoing conditions (1) to (6) will be explained in more details.

The condition (1) defines a suitable range on the ratio of the amount of axial movement of the fifth lens group G5 to the variation of focal length of the entire lens system in the refractive power varying operation from the wide angle end to the telescopic end. The amount of axial movement of the fifth lens group G5 in the refractive power varying operation from the wide angle end to the telescopic end corresponds to the amount of variation of the back focus of the entire lens system, and is related to the proportion borne by the fifth lens group G5, in the variation of focal length of the entire lens system.

In the present invention, the fifth lens group G5 is a negative lens group closest to the image side, and is so used as to increase the image magnification at the refractive power varying operation from the wide angle end to the telescopic end. Consequently the amount of variation of the imaging magnification of the fifth lens group G5 becomes larger, as the variation of the back focus becomes larger relative to the variation of focal length of the entire lens system. Stated differently, the condition (1) defines the proportion of contribution of the fifth lens group G5 to the zooming ratio of the entire lens system.

An area above the upper limit of the condition (1) is not desirable, because the proportion of the fifth lens group G5 in the zooming ratio becomes excessively large, so that it becomes difficult to satisfactorily suppress the variation of the off-axial aberrations generated in said fifth lens group G5 at the refractive power varying operation.

On the other hand, below the lower limit of the condition (1), the variation in the off-axial aberration generated in the fifth lens group G5 in the refractive power varying operation can be satisfactorily suppressed, as the proportion of the zooming ratio, borne by the fifth lens group G5, becomes smaller. However, the proportion of the zooming ratio, borne by the first to fourth lens groups, becomes larger, and the off-axial ray, passing the second lens group G2, does not vary much in the height but varies significantly in the incident angle. For this reason, it becomes difficult to satisfactorily suppress the variation of the off-axial aberrations generated in said second lens group G2.

The condition (2) defines a suitable range on the ratio of the focal length f1 of the first lens group G1 to the focal length f2 of the second lens group G2.

Above the upper limit of the condition (2), the focal length f1 of the first lens group G1 becomes smaller, in the positive side, relative to the focal length f2 of the second lens group G2, so that the converging effect becomes stronger, thus enabling to shorten the length of the entire lens system at the telescopic end. This area is however undesirable because the off-axial ray, passing the first lens group G1, is separated from the optical axis, thus requiring a larger effective diameter in the frontmost lens. Also it becomes impossible to satisfactorily suppress the positive distortion, particularly at the telescopic end, because the first lens group G1 moves significantly to the object side, thus resulting in an asymmetric arrangement of the refractive powers.

Besides, because of the above-mentioned stronger converging effect, there cannot be obtained sufficient back focus at the wide angle end, and the effective diameter of the rearmost lens becomes larger. Such situation is undesirable as it is against the compactization, aimed at in the present invention.

On the other hand, below the lower limit of the condition (2), there can be obtained sufficient back focus at the wide angle end, and the off-axial ray passing the fifth lens group G5 comes closer to the optical axis, so that the effective diameter of the rearmost lens can be reduced. In this area, however, the length of the entire lens system becomes larger at the telescopic end, against the compactization aimed at in the present invention.

The condition (3) defines a suitable range on the ratio of variation in the axial air gap between the second and third lens groups G2, G3 to variation in the axial air gap between the fourth and fifth lens groups G4, G5 in the refractive power varying operation from the wide angle end to the telescopic end. Stated differently, the condition (3) relates to the proportions of the zooming ratio, borne by each of the second to fifth lens groups.

Above the upper limit of the condition (3), the variation in the imaging magnification of the second and third lens groups G2, G3 in the refractive power varying operation becomes larger, so that the proportion of the zooming ratio, borne by these lens groups becomes excessively large. Consequently it becomes difficult to suppress the variation in the off-axial aberrations generated in the second and third lens groups G2, G3 in said operation.

For further improving the imaging characteristics, the upper limit value of the condition (3) is preferably selected as 0.5.

On the other hand, below the lower limit of the condition (3), the variation in the imaging magnification of the fifth lens group G5 at the refractive power varying operation becomes larger, so that the proportion of the zooming ratio, borne by said lens group, becomes excessively large. Consequently it becomes difficult to satisfactorily suppress the variation in the off-axial aberrations generated in the fifth lens group G5 at said operation.

The condition (4) defines a suitable range of the focal length f1 of the first lens group G1, relative to the focal length fw of the entire lens system at the wide angle end and the focal length ft of the entire lens system at the telescopic end.

Above the upper limit of the condition (4), the focal length f1 of the first lens group G1 increases positively, whereby the converging effect becomes weaker and the length of the entire lens system at the telescopic end increases.

On the other hand, below the lower limit of the condition (4), the focal length of the first lens group G1 decreases positively. Thus it becomes difficult to correct the negative spherical aberration at the telescopic end, and to satisfactorily correct the variation in the image plane curvature, generated in the first lens group G1 at the refractive power varying operation from the wide angle end to the telescopic end.

The condition (5) defines a suitable range on the ratio of the focal length of the second lens group G2 to that of the third lens group G3.

Above the upper limit of the condition (5), the focal length of the third lens group G3 becomes smaller in the negative side, with respect to the focal length of the second lens group G2, but the synthesized principal point of the second and third lens groups G2, G3 is positioned toward the image side, at the telescopic end. Consequently the length of the entire lens system can be reduced, but the synthesized refractive power of the second to fourth lens groups varies larger at the refractive power varying operation from the wide angle end to the telescopic end. As a result, in case of designing for a larger zoom ratio, it becomes difficult to satisfactorily suppress the variation in the off-axial aberrations generated in the third lens group G3 at the refractive power varying operation from the wide angle end to the telescopic end.

On the other hand, below the lower limit of the condition (5), the focal length of the second lens group G2 decreases in the negative side, relative to that of the third lens group G3, so that the synthesized principal point of the second and third lens groups G2, G3 becomes positioned closer to the object side at the telescopic end, thus excessively increasing the length of the entire lens system in this position.

The condition (6) defines a suitable ratio between the focal lengths of the second and fifth lens groups G2, G5.

Above the upper limit of the condition (6), the focal length of the second lens group G2 decreases in the negative side with respect to that of the fifth lens group G5, so that the length of the entire lens system undesirably increases at the telescopic end. Also as the principal ray passing the second lens group G2 comes closer to the optical axis, it becomes difficult to suppress, at the wide angle end, the variation of the coma aberration dependent on the image angle, and thus to constitute the second lens group G2 with a limited number of lenses.

On the other hand, below the lower limit of the condition (6), the focal length of the fifth lens group G5 decreases in the negative side with respect to that of the second lens group G2, so that it becomes difficult to satisfactorily correct, at the wide angle end, the variation of the off-axial aberrations dependent on the image angle, and thus to satisfactorily suppress the variation in the off-axial aberrations generated in the fifth lens group G5 at the refractive power varying operation from the wide angle end to the telescopic end. Also positive distortion is undesirably generated at the wide angle end.

For attaining further improved imaging performance, it is desirable that, in addition to the foregoing conditions, the fifth lens group G5 includes at least a positive meniscus lens concave to the object side and at least a negative lens concave to the object side.

The barrel structure may be simplified by moving the first and fifth lens groups G1, G5 or the second and fourth lens groups G2, G4 in integral manner, at the refractive power varying operation from the wide angle end to the telescopic end.

It is also possible, at such operation, to move the first and fifth lens groups G1, G5 and the second and fourth lens groups G2, G4 in respectively integral manner, thereby achieving further simplification in the barrel structure.

In another aspect of the present invention, there is provided a zoom lens which comprises, as shown in FIG. 3, in the order from the object side, a first lens group G1 having a positive refractive power, a second lens group G2 having a negative refractive power, a third lens group G3 having a negative refractive power, a fourth lens group G4 having a positive refractive power and a fifth lens group G5 having a negative refractive power, wherein, at the refractive power varying operation from the wide angle end to the telescopic end, at least said first and fifth lens groups G1, G5 move toward the object side, while the air gap between said first and second lens groups G1, G2 increases and the air gaps between said third and fourth lens groups G3, G4 and between said fourth and fifth lens groups G4, G5 decrease, and wherein said third lens group G3 is moved toward the object side at the focusing operation from a larger object distance to a smaller object distance.

The above-mentioned zoom lens preferably satisfies conditions:

$$1 < |f2|/f1 < 3 \tag{7}$$

$$0.2 < (f2-f3)/(f2+f3) < 0.8 \tag{8}$$

wherein f1, f2 and f3 stand respectively for the focal lengths of said first, second and third lens groups G1, G2, G3.

Otherwise the above-mentioned zoom lens preferably satisfy following conditions:

$$-0.3 < 1/\beta 2w < 0.5 \tag{9}$$

$$-0.7 < \beta 3t < 0.3 \tag{10}$$

wherein β2w is the imaging magnification of the second lens group G2 at the wide angle end and β3t is that of the third lens group G3 at the telescopic end.

Thus the zoom lens according to another embodiment of the present invention comprises, in the order from the object side, a first lens group G1 having a positive refractive power, a second lens group G2 having a negative refractive power, a third lens group G3 having a negative refractive power, a fourth lens group G4 having a positive refractive power and a fifth lens group G5 having a negative refractive power, and is so constructed that, at the refractive power varying operation from the wide angle end to the telescopic end, at least said first and fifth lens groups G1, G5 move toward the object side, while the air gap between said first and second lens groups G1, G2 increases and the air gaps between said third and fourth lens groups G3, G4 and between said fourth and fifth lens groups G4, G5 decrease, and that said third lens group G3 is moved to the object side at the focusing operation from a larger object distance to a smaller object distance.

With such configuration there can be obtained a zoom lens which is featured by a compact size, a sufficiently small amount of work required for the focusing operation and a limited number of component lenses and still can attain a large zoom ratio.

In the following there will be explained the conditions for focusing with the third lens group G3.

For focusing to an object moving from a larger distance to a smaller distance with the third lens group G3, it should be so moved that the object point formed by the first to third lens groups remains constant relative to the fourth lens group G4. The conditions for reducing the amount Δ of movement of the third lens group G3 in such case will be explained, with an example of a thin lens system.

Let us consider a situation where, for a movement by δ of the object point relative to the third lens group G3, said third lens group G3 is moved by Δ in order to maintain the object point at a constant position relative to the fourth lens group G4. In such situation, the moving amount Δ of the third lens group G3 can be represented, utilizing the imaging magnification β3 thereof, by the following equation (e):

$$\Delta = \{\beta 3^2/(\beta 3^2-1)\} \cdot \delta \tag{e}$$

By taking $k=\delta 3^2/(\delta 3^2-1)$, there stand following relations:

$$1 < k (\beta 3^2 > 1) \tag{f}$$

$$0 > k (\beta 3^2 < 1) \tag{g}$$

In order to minimize the absolute value of the moving amount Δ, it is necessary, in case of $\beta 3^2 > 1$, to bring k as close as possible to 1 or to bring 1/β3 as close as possible to 0, and, in case of $\beta 3^2 < 1$, to bring k as close as possible to 0 or namely to bring β3 as close as possible to 0. In the present invention, the moving amount of the third lens group G3 at the focusing operation is reduced by selecting β3 close to zero.

Since the imaging magnification of the third lens group G3 is selected, in the present invention, as closely as possible to zero as explained above, it is desirable to bring the synthesized refractive power of the first and second lens groups G1, G2 as close as possible to zero. It is therefore desirable to select 1/β2 close to zero, wherein β2 is the magnification at use of the second lens group G2.

In the following there will be explained each of the foregoing conditions (7) to (10).

The conditions (7) and (8) respectively define suitable ranges on the ratio of the focal length f2 of the second lens group G2 to that f1 of the first lens group G1, and on the ratio of the focal lengths of the second and third lens groups G2, G3, and are both related to the moving amount of the third lens group G3 in the focusing operation.

Above the upper limit of the condition (7), the second lens group G2 has a longer focal length, thus a weaker diverging effect leading to a shorter length of the entire lens system, but such area is undesirable because the off-axial ray, passing the fifth lens group G5, becomes distant from the optical axis due to the shortened back focus, so that the lenses have to be increased in diameter. Also the moving amount of the third lens group G3 at the focusing operation increases, against the intention of the present invention to sufficiently decrease the amount of work required for the focusing operation.

On the other hand, below the lower limit of the condition (7), the moving amount of the third lens group G3 at the focusing operation decreases, but the lens system becomes undesirably large because the synthesized refractive power of the first and second lens groups G1, G2 decreases in the positive side, thus providing a weaker converging effect.

For attaining further improved imaging performance, the upper limit is preferably selected as 2 or lower.

Above the upper limit of the condition (8), the synthesized principal point of the second and third lens groups G2, G3 moves toward the image plane, thus enabling to reduce the length of the entire lens system at the telescopic end, but it becomes difficult to satisfactorily correct the variation in the spherical aberration, generated in the third lens group G3 at the focusing operation.

On the other hand, below the lower limit of the condition (8), the moving amount of the third lens group G3 at the focusing operation decreases, thus providing a sufficient back focus at the wide angle end and enabling to reduce the effective diameter of the rearmost lens. However, the length of the entire lens system increases at the telescopic end, and it becomes difficult to satisfactorily correct the variation in the spherical aberration, generated in the second lens group G2 at the focusing operation.

The conditions (9) and (10) are required, as already explained before, for decreasing the moving amount of the third lens group G3 in the focusing operation, while maintaining satisfactory imaging performance from the infinite object distance to the shortest object distance.

Above the upper limit of the condition (9), the synthesized refractive power of the first and second lens groups G1, G2 increases in the positive side, thus providing a stronger converging effect at the telescopic end and enabling compactization of the lens. However there cannot be obtained a sufficient back focus, and it becomes difficult to satisfactorily correct the positive distortion aberration, because the moving amount of the third lens group G3 at the focusing operation decreases, thus weakening the diverging effect at the wide angle end.

On the other hand, below the lower limit of the condition (9), the synthesized refractive power of the first and second lens groups G1, G2 increases in the negative side, thereby enabling to satisfactorily correct the positive distortion which tends to appear at the wide angle end, thus providing a sufficient back focus. It however becomes difficult to satisfactorily correct the variation in the coma aberration dependent on the image angle, since the moving amount of the third lens group G3 at the focusing operation increases and the off-axial ray passing the second lens group G2 comes close to the optical axis at the wide angle end.

For attaining further improved imaging performance, the lower limit is preferably selected as 0 or larger.

Above the upper limit of the condition (10), the synthesized refractive power of the first to third lens groups G1–G3 increases in the negative side, thus allowing to satisfactorily correct the positive distortion at the wide angle end and providing a sufficient back focus. This area is however undesirable, because the moving amount of the third lens group G3 at the focusing operation becomes large and the length of the entire lens system at the telescopic end increases.

On the other hand, below the lower limit of the condition (10), the synthesized refractive power of the first to third lens groups G1–G3 decreases in the negative side, thus allowing to decrease the length of the entire lens system at the telescopic end, but the moving amount of the third lens group G3 at the focusing operation undesirably increases.

For attaining further improved imaging performance, the upper limit is preferably selected as 0 or less.

For attaining further improvement on the imaging performance, it is desirable, in addition to the aforementioned conditions (7) and (8), or (9) and (10), to satisfy a following condition (11):

$$0.4 < \Delta Bf/(ft-fw) < 0.8. \tag{11}$$

This condition (11) is identical with the condition (1) explained before and will not, therefore, be explained further.

For attaining further improvement on the imaging performance, it is desirable, in addition to the foregoing conditions, that the lens face closest to the object side in the third lens group G3 is concave to the object side and that a following condition (12) is further satisfied:

$$-0.4 < ro/ri < 0.5 \tag{12}$$

wherein ro is the radius of curvature of the lens face closest to the object side in the third lens group G3, and ri is the radius of curvature of the lens face closest to the image side in the third lens group G3.

The condition (12) defines the ratio of the radii of curvature of the lens faces closest to the object side and closest to the image side in the third lens group, for satisfactorily suppressing the variation in aberrations at the focusing operation.

Above the upper limit of the condition (12), the variation in image plane curvature, generated at the focusing operation, increases undesirably.

On the other hand, below the lower limit of the condition (12), there results an increase in the negative spherical aberration generated in the third lens group G3, leading to an increase in the variation of spherical aberration generated at the refractive power varying operation from the wide angle end to the telescopic end, and also an increase in the variation of spherical aberration generated at the focusing operation.

In the present invention meeting the foregoing conditions, the first and fifth lens group G1, G5 and the second and fourth lens groups G2, G4 may be moved in respectively integral manner in the refractive power varying operation from the wide angle end to the telescopic end, and the barrel structure may be further simplified in such case.

Preferred embodiments of the present invention will be described in the following, with reference to the attached drawings.

DETAILED DESCRIPTION OF THE PREFERRED EMBODIMENTS

Example 1

Figure 5:
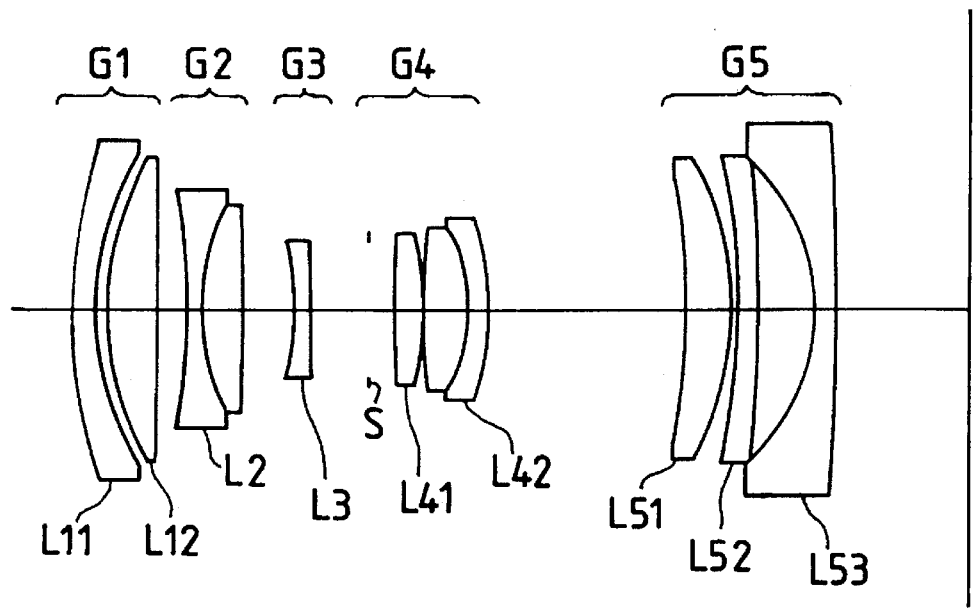
FIG. 5 is a view showing the configuration of a 1st example of the zoom lens of the present invention.

FIG. 5 illustrates the configuration of a zoom lens constituting a first example of the present invention.

The illustrated zoom lens is composed, in the order from the object side, of a first lens group G1 consisting of a negative meniscus lens component L11 convex to the object side and a biconvex lens component L12, a second lens group G2 consisting of an adhered lens L2 formed from a biconcave lens component and a biconvex lens component, a third lens group G3 consisting of a negative meniscus lens L3 concave to the object side, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side and a negative meniscus lens component L53 convex to the image side.

A stop S is positioned between the third lens group G3 and the fourth lens group G4, and moves integrally with the fourth lens group G4 at the refractive power varying operation from the wide angle end to the telescopic end.

Figure 1:
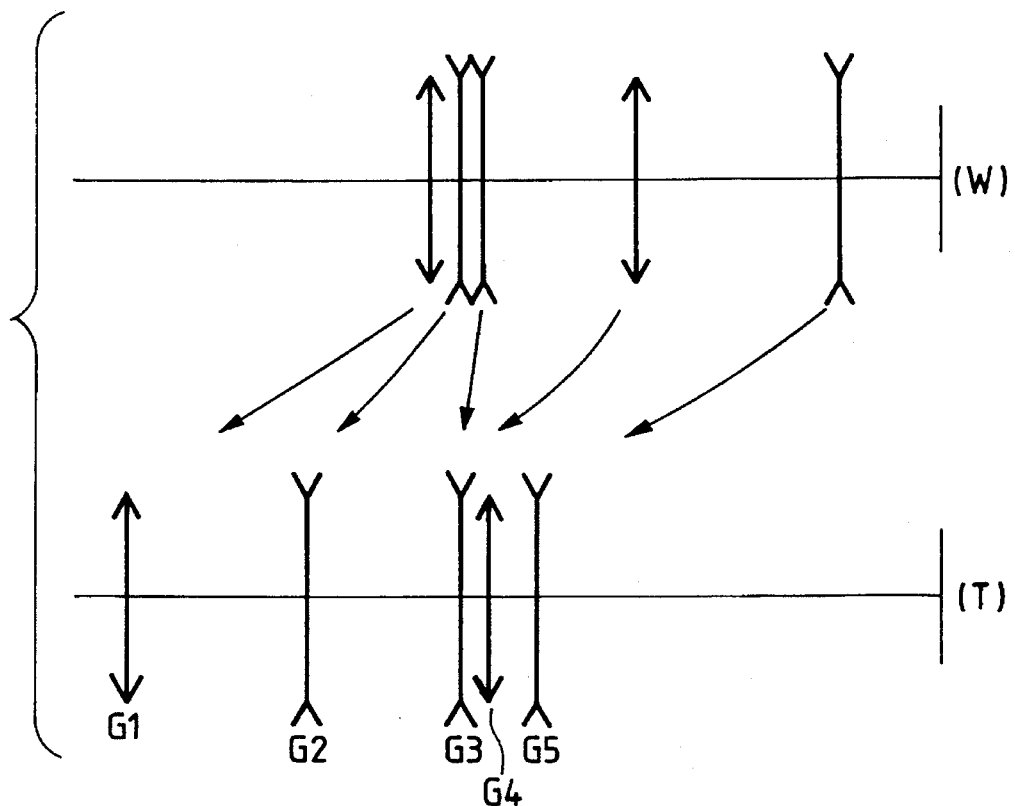
FIG. 1 is a view showing the basic configuration of an embodiment of the zoom lens of the present invention and the mode of movement of the lens groups at the refractive power varying operation from the wide angle end (W) to the telescopic end (T)
Figure 2:
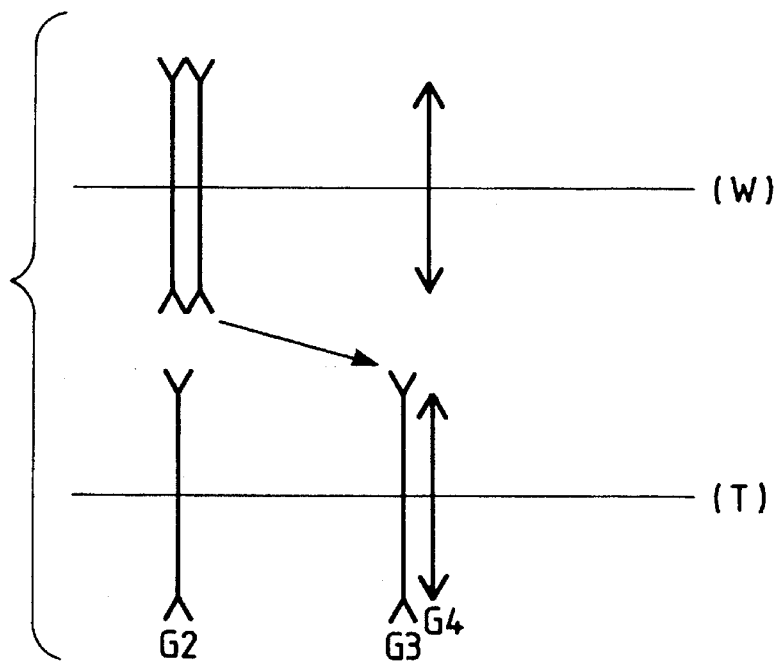
FIG. 2 is a view showing the arrangement of the third and fourth lens groups G3, G4 relative to the second lens group G2 at the refractive power varying operation from the wide angle end (W) to the telescopic end (T)

FIG. 5 shows the positions of the lens groups at the wide angle end, and said lens groups axially move along the zoom trajectories indicated by arrows in FIG. 1, at the refractive power variation to the telescopic end.

Following Table 1 shows the parameters of the example 1 of the present invention, wherein f stands for the focal length, FNO for F-number, $2\omega$ for image angle and Bf for back focus. The refractive index and Abbe's number are given by values for d-line ($\lambda$=587.6 nm).

TABLE 1

$f = 39.2–81.1–111.7$
$FNO = 4.1–6.8–8.2$
$2\omega = 57.8–29.0–21.4°$

| Face No. | Radius of Curvature | Face Distance | Ref. Index | Abbe's Number |
|---|---|---|---|---|
| 1 | 39.1761 | 1.651 | 1.80518 | 25.35 |
| 2 | 21.5442 | 0.635 | | |
| 3 | 21.2695 | 3.937 | 1.62280 | 57.03 |
| 4 | −344.9316 | (d4 = variable) | | |
| 5 | −52.5310 | 1.270 | 1.77279 | 49.45 |
| 6 | 17.2373 | 2.921 | 1.75520 | 27.61 |
| 7 | −135.3903 | (d7 = variable) | | |
| 8 | −20.1769 | 1.270 | 1.77279 | 49.45 |
| 9 | −152.8922 | (d9 = variable) | | |
| 10 | ∞ | 1.905 | (stop) | |
| 11 | 90.5093 | 2.032 | 1.62041 | 60.14 |
| 12 | −29.2096 | 0.127 | | |
| 13 | 45.0709 | 3.429 | 1.51860 | 69.98 |
| 14 | −11.6430 | 1.524 | 1.80518 | 25.35 |
| 15 | −20.5732 | (d15 = variable) | | |
| 16 | −54.9808 | 3.175 | 1.80518 | 25.35 |
| 17 | −21.9497 | 0.635 | | |
| 18 | −49.2045 | 1.524 | 1.84042 | 43.35 |
| 19 | −143.2813 | 4.191 | | |
| 20 | −14.9454 | 1.524 | 1.77279 | 49.45 |
| 21 | −283.9813 | (Bf) | | |

(Variable distances in lens movement)

| | | | |
|---|---|---|---|
| f | 39.2007 | 81.1237 | 111.7178 |
| d4 | 2.0053 | 11.5430 | 15.3403 |
| d7 | 3.8056 | 5.0756 | 6.3456 |
| d9 | 4.2014 | 2.9314 | 1.6614 |
| d15 | 15.1344 | 4.8474 | 1.7994 |
| Bf | 10.1281 | 37.2092 | 52.4451 |

(Conditional values)

(1) $\Delta Bf/(ft - fw) = 0.584$
(2) $|f2|/f1 = 1.471$
(3) $(d2, 3t - d2, 3w) (d4, 5w - d4, 5t) = 0.190$
(4) $f1/(fw \cdot ft)^{1/2} = 1.032$
(5) $(f2 - f3)/(f2 + f3) = 0.537$
(6) $f5/f2 = 0.283$

Example 2

Figure 6:
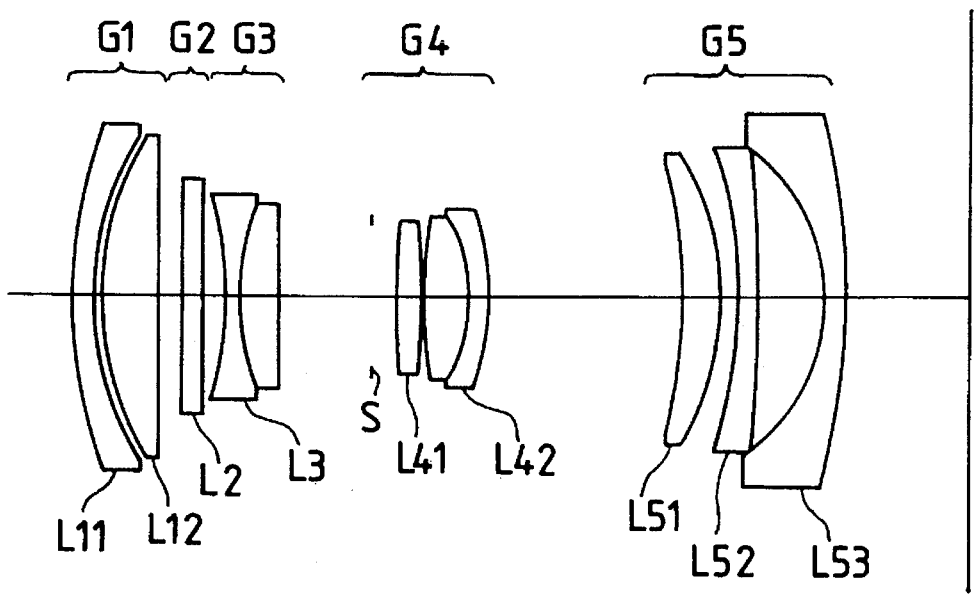
FIG. 6 is a view showing the configuration of a 2nd example of the zoom lens of the present invention.

FIG. 6 illustrates the configuration of a zoom lens constituting a second example of the present invention.

The illustrated zoom lens is composed, in the order from the object side, of a first lens group G1 consisting of a negative meniscus lens component L11 convex to the object side and a biconvex lens component L12, a second lens group G2 consisting of a biconcave lens component L2, a third lens group G3 consisting of an adhered lens L3 formed from a biconcave lens component and a biconvex lens component, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side, and a negative meniscus lens component L53 convex to the image side.

A stop S is positioned between the third lens group G3 and the fourth lens group G4, and moves integrally with the fourth lens group G4 at the refractive power varying operation from the wide angle end to the telescopic end.

FIG. 6 shows the positions of the lens groups at the wide angle end, and said lens groups axially move along the zoom trajectories indicated by arrows in FIG. 1 at the refractive power varying operation to the telescopic end.

The zoom lens of the example 2 are similar to that of the example 1 in configuration, but is different in the refractive power and shape of the lens groups.

Following Table 2 shows the parameters of the example 2 of the present invention, wherein f stands for the focal length, FNO stands for the F-number, 2ω for image angle and Bf for back focus. The refractive index and Abbe's number are given by values for the d-line (λ=587.6 nm).

TABLE 2 f = 39.0–64.9–111.6
FNO = 4.1–5.6–8.2
2ω = 59.8–36.2–21.6°

| Face No. | Radius of Curvature | Face Distance | Ref. Index | Abbe's Number |
|---|---|---|---|---|
| 1 | 37.8196 | 1.645 | 1.80518 | 25.35 |
| 2 | 24.5032 | 0.633 | | |
| 3 | 24.8156 | 3.922 | 1.62280 | 57.03 |
| 4 | 526.2988 | (d4 = variable) | | |
| 5 | –182.2654 | 1.265 | 1.67025 | 57.53 |
| 6 | 262.9587 | (d6 = variable) | | |
| 7 | –25.9559 | 1.265 | 1.77279 | 49.45 |
| 8 | 20.6272 | 2.910 | 1.75520 | 27.61 |
| 9 | –156.2550 | (d9 = variable) | | |
| 10 | ∞ | 1.898 | (stop) | |
| 11 | 59.3285 | 2.024 | 1.62041 | 60.14 |
| 12 | –74.4488 | 0.127 | | |
| 13 | 42.7619 | 3.289 | 1.51860 | 69.98 |
| 14 | –11.7310 | 1.518 | 1.80518 | 25.35 |
| 15 | –20.1969 | (d15 = variable) | | |
| 16 | –41.2914 | 2.783 | 1.75520 | 27.61 |
| 17 | –20.5561 | 1.392 | | |
| 18 | –34.4616 | 1.518 | 1.74810 | 52.30 |
| 19 | –123.6789 | 4.870 | | |
| 20 | –13.8210 | 1.518 | 1.71300 | 53.93 |
| 21 | –57.1001 | (Bf) | | |

(Variable distances in lens movement)

| f | 39.0135 | 64.9078 | 111.6173 |
|---|---|---|---|
| d4 | 2.0201 | 8.9776 | 15.3026 |
| d6 | 1.7702 | 4.6164 | 6.1977 |
| d9 | 6.7939 | 3.9477 | 2.3664 |
| d15 | 14.6690 | 7.7115 | 1.2600 |
| Bf | 9.4291 | 25.5311 | 54.1223 |

(Conditional values)

(1) ΔBf/(ft − fw) = 0.616
(2) |f2|/f1 = 2.041
(3) (d2, 3t − d2, 3w) (d4, 5w − d4, 5t) = 0.330
(4) f1/(fw · ft)^{1/2} = 1.191
(5) (f2 − f3)/(f2 + f3) = 0.607
(6) f5/f2 = 0.182

Example 3

Figure 7:
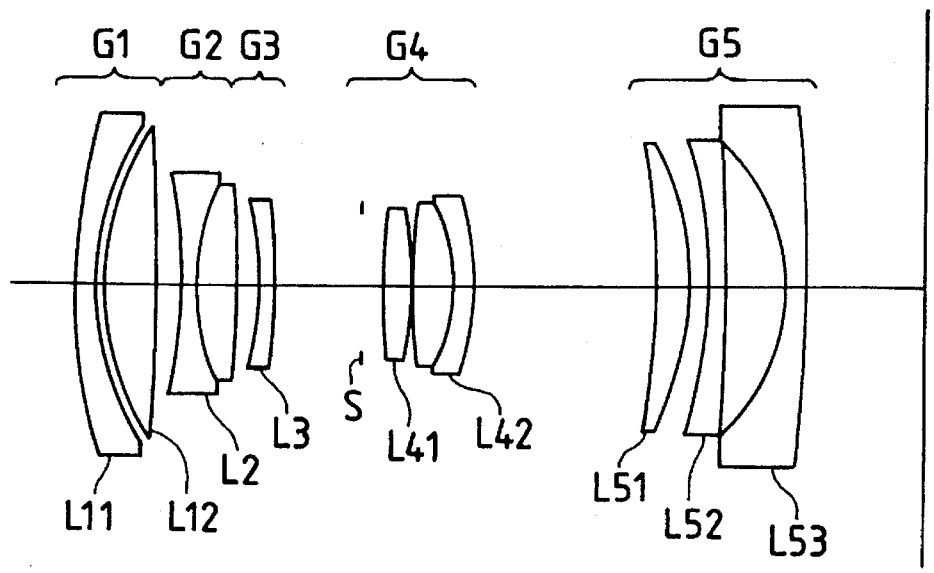
FIG. 7 is a view showing the configuration of a 3rd example of the zoom lens of the present invention.

FIG. 7 shows the configuration of a zoom lens constituting a third example of the present invention.

The illustrated zoom lens is composed, in the order from the object side, of a first lens group G1 consisting of a negative meniscus lens component L11 convex to the object side and a biconvex lens component L12, a second lens group G2 consisting of an adhered lens L2 formed from a biconcave lens component and a biconvex lens component, a third lens group G3 consisting of a negative meniscus lens L3 concave to the object side, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side and a negative meniscus lens component L53 convex to the image side.

A stop S is positioned between the third lens group G3 and the fourth lens group G4, and moves integrally with the fourth lens group G4 at the refractive power varying operation from the wide angle end to the telescopic end.

FIG. 7 shows the positions of the lens groups at the wide angle end, and, the lens groups axially move along the zoom trajectories indicated by arrows in FIG. 1, at the refractive power varying operation to the telescopic end.

The zoom lens of the example 3 are similar to that of the example 1 in configuration, but is different in the refractive power and shape of the lens groups.

Following Table 3 shows the parameters of the example 3, wherein f stands for the focal length, FNO for the F-number, 2ω for the image angle and Bf for the back focus. The refractive index and Abbe's number are given by values for the d-line (λ=587.6 nm).

TABLE 3 f = 39.2–62.6–111.3
FNO = 4.0–5.5–8.2
2ω = 59.2–37.2–21.6°

| Face No. | Radius of Curvature | Face Distance | Ref. Index | Abbe's Number |
|---|---|---|---|---|
| 1 | 42.3709 | 1.647 | 1.80518 | 25.35 |
| 2 | 22.8367 | 0.634 | | |
| 3 | 22.7973 | 3.928 | 1.62280 | 57.03 |
| 4 | –238.8026 | (d4 = variable) | | |
| 5 | –37.2609 | 1.267 | 1.77279 | 49.45 |
| 6 | 18.5908 | 2.914 | 1.75520 | 27.61 |
| 7 | –148.0219 | (d7 = variable) | | |
| 8 | –25.5740 | 1.267 | 1.77279 | 49.45 |
| 9 | –51.6916 | (d9 = variable) | | |
| 10 | ∞ | 1.900 | (stop) | |
| 11 | 81.5528 | 2.027 | 1.62041 | 60.14 |
| 12 | –44.9562 | 0.127 | | |
| 13 | 48.7867 | 3.421 | 1.51860 | 69.98 |
| 14 | –12.7597 | 1.520 | 1.80518 | 25.35 |
| 15 | –22.6826 | (d15 = variable) | | |
| 16 | –60.8357 | 2.787 | 1.75520 | 27.61 |
| 17 | –22.3536 | 1.394 | | |
| 18 | –35.5209 | 1.520 | 1.74810 | 52.30 |
| 19 | –188.9484 | 4.688 | | |
| 20 | –14.9094 | 1.520 | 1.71300 | 53.93 |
| 21 | –136.7193 | (Bf) | | |

(Variable distances in lens movement)

| f | 39.1535 | 62.5821 | 111.2697 |
|---|---|---|---|
| d4 | 2.0231 | 8.9913 | 15.4527 |
| d7 | 1.7729 | 3.6733 | 6.2072 |
| d9 | 6.8043 | 4.9039 | 2.3700 |
| d15 | 14.6915 | 7.7233 | 1.2619 |
| Bf | 9.5317 | 24.7211 | 53.5031 |

(Conditional values)

(1) ΔBf/(ft − fw) = 0.611
(2) |f2|/f1 = 0.856
(3) (d2, 3t − d2, 3w) (d4, 5w − d4, 5t) = 0.330
(4) f1/(fw · ft)^{1/2} = 1.084
(5) (f2 − f3)/(f2 + f3) = −0.045
(6) f5/f2 = 0.457

Example 4

Figure 8:
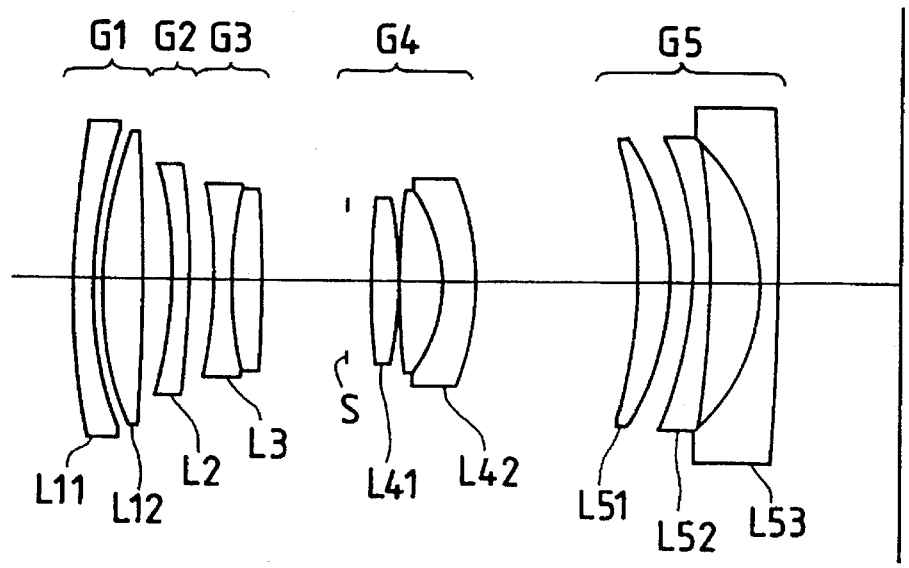
FIG. 8 is a view showing the configuration of a 4th example of the zoom lens of the present invention.

FIG. 8 shows the configuration of a zoom lens constituting a fourth example of the present invention.

The illustrated zoom lens is composed, in the order from the object side, of a first lens group G1 consisting of a negative meniscus lens component L11 convex to the object side and a biconvex lens component L12, a second lens group G2 consisting of a negative meniscus lens L2 concave to the object side, a third lens group G3 consisting of an adhered lens L3 formed from a biconcave lens component and a biconvex lens component, a fourth lens group G4 consisting of a biconvex lens component L41 and an adhered positive lens component L42 having an adhered face convex to the image side, and a fifth lens group G5 consisting of a positive meniscus lens convex to the image side, a negative lens component concave to the object side and a negative meniscus lens component L53 convex to the image side.

A stop S is positioned between the third lens group G3 and the fourth lens group G4, and moves integrally with the fourth lens group G4 at the refractive power varying operation from the wide angle end to the telescopic end.

FIG. 8 shows the positions of the lens groups at the wide angle end, and, said lens groups axially move along the zoom trajectories indicated by arrows in FIG. 1, at the refractive power varying operation to the telescopic end.

The zoom lens of the example 4 is similar to that of the example 1 in configuration, but is different in the refractive power and shape of the lens groups.

Following Table 4 shows the parameters of the example 4, wherein f stands for the focal length, FNO for the F-number, $2\omega$ for the image angle and Bf for the back focus. The refractive index and Abbe's number are given by values for the d-line ($\lambda$=587.6 nm).

TABLE 4

$f = 39.0–63.1–111.1$
$FNO = 3.7–5.2–8.0$
$2\omega = 59.2–37.0–21.6°$

| Face No. | Radius of Curvature | Face Distance | Ref. Index | Abbe's Number |
|---|---|---|---|---|
| 1 | 60.5278 | 1.641 | 1.80518 | 25.35 |
| 2 | 34.7806 | 0.631 | | |
| 3 | 30.7151 | 3.147 | 1.62280 | 57.03 |
| 4 | −228.7947 | (d4 = variable) | | |
| 5 | −29.4103 | 1.262 | 1.67025 | 57.53 |
| 6 | −64.0262 | (d6 = variable) | | |
| 7 | −36.7238 | 1.262 | 1.77279 | 49.45 |
| 8 | 29.1277 | 2.406 | 1.75520 | 27.61 |
| 9 | −105.3165 | (d9 = variable) | | |
| 10 | ∞ | 1.893 | (stop) | |
| 11 | 66.1851 | 2.064 | 1.62041 | 60.14 |
| 12 | −51.0312 | 0.126 | | |
| 13 | 55.6168 | 3.433 | 1.51860 | 69.98 |
| 14 | −12.1334 | 2.639 | 1.80518 | 25.35 |
| 15 | −21.3151 | (d15 = variable) | | |
| 16 | −38.1622 | 2.671 | 1.75520 | 27.61 |
| 17 | −19.7780 | 1.790 | | |
| 18 | −26.2643 | 1.515 | 1.74810 | 52.30 |
| 19 | −66.0439 | 3.752 | | |
| 20 | −15.2834 | 1.515 | 1.71300 | 53.93 |
| 21 | −231.6359 | (Bf) | | |

(Variable distances in lens movement)

| f | 38.9984 | 63.1049 | 111.0646 |
|---|---|---|---|
| d4 | 2.5219 | 8.6014 | 13.7360 |
| d6 | 1.8931 | 3.8862 | 6.4678 |
| d9 | 6.6950 | 4.7019 | 2.1203 |
| d15 | 13.1072 | 7.0277 | 1.8931 |
| Bf | 9.6548 | 25.4148 | 54.6650 |

(Conditional values)

(1) $\Delta Bf/(ft - fw) = 0.625$
(2) $|f2|/f1 = 1.090$
(3) $(d2, 3t - d2, 3w) (d4, 5w - d4, 5t) = 0.408$
(4) $f1/(fw \cdot ft)^{1/2} = 1.148$
(5) $(f2 - f3)/(f2 + f3) = 0.077$
(6) $f5/f2 = 0.299$ In the following there will be given examples of the present invention, in which the third lens group G3 is moved toward the object side at the focusing operation from a longer object distance to a shorter object distance.

Example 5

Figure 9:
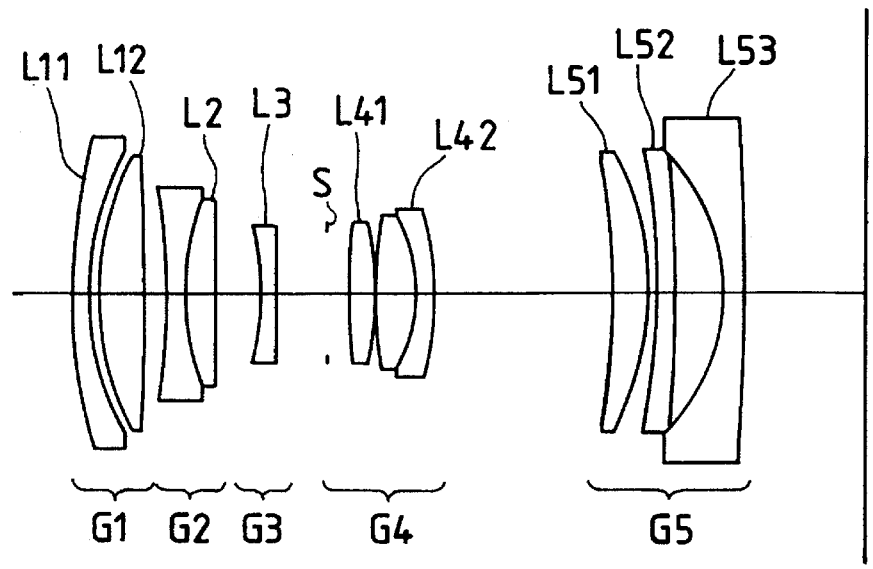
FIG. 9 is a view showing the configuration of a 5th example of the zoom lens of the present invention.

FIG. 9 shows the configuration of a zoom lens constituting a fifth example of the present invention.

The illustrated zoom lens is composed, in the order from the object side, of a first lens group G1 consisting of a negative meniscus lens component L11 convex to the object side and a biconvex lens component L12, a second lens group G2 consisting of an adhered lens L2 formed from a biconcave lens component and a biconvex lens component, a third lens group G3 consisting of a negative meniscus lens L3 concave to the object side, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side and a negative lens component L53 convex to the image side.

A stop S is positioned between the third lens group G3 and the fourth lens group G4, and moves integrally with the fourth lens group G4 at the refractive power varying operation from the wide angle end to the telescopic end.

Figure 3:
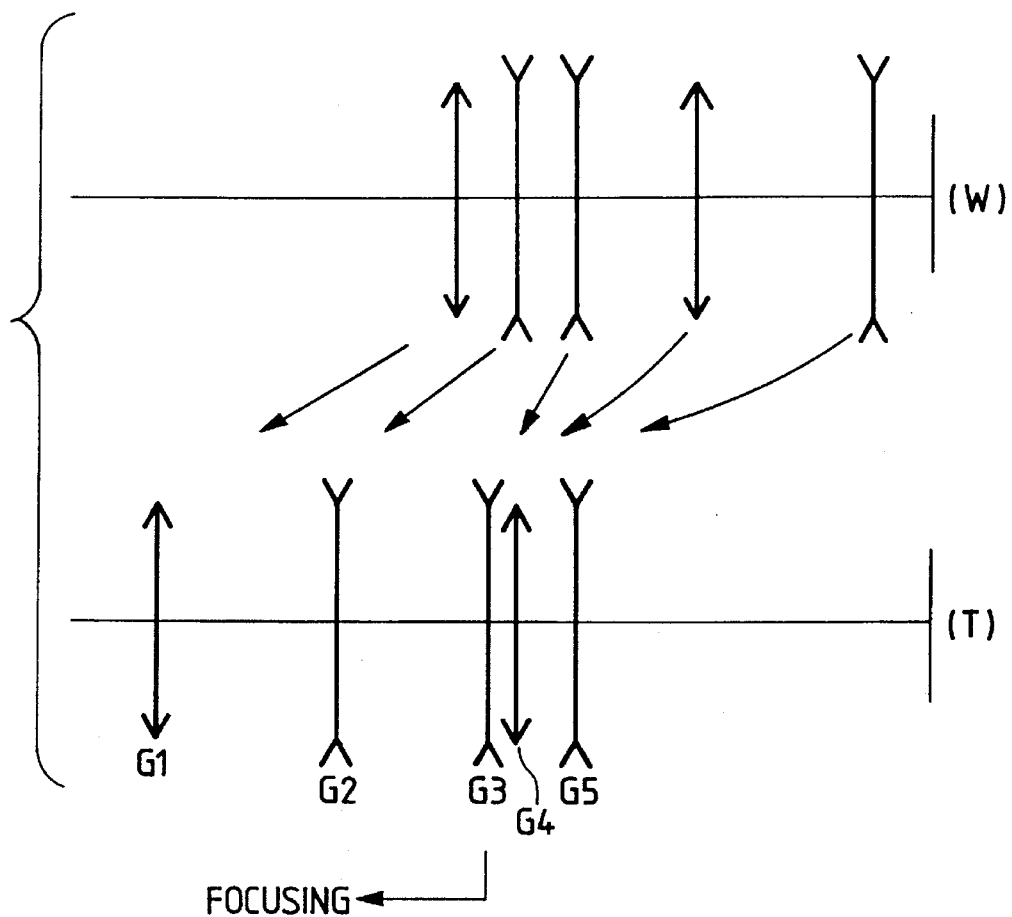
FIG. 3 is a view showing the basic configuration of another embodiment of the zoom lens of the present invention and the mode of movement of the lens groups at the refractive power varying operation from the wide angle end (W) to the telescopic end (T)
Figure 4:
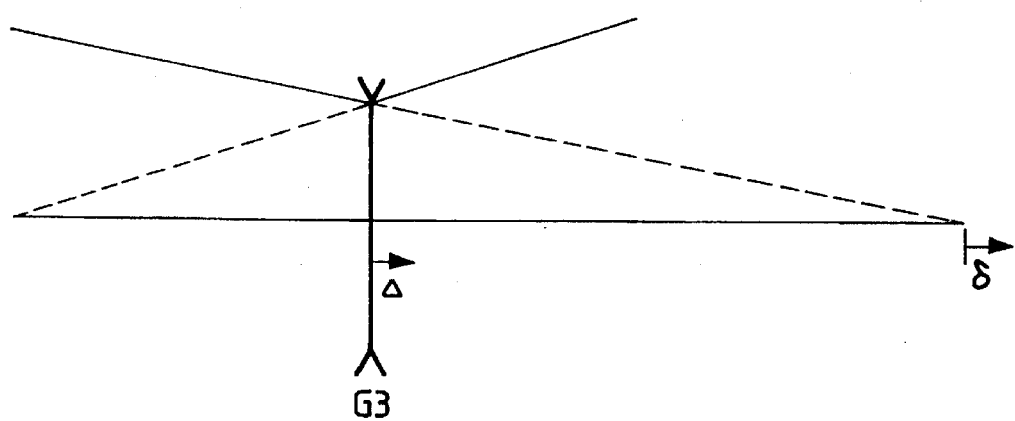
FIG. 4 is a view showing the moving amount $\Delta$ of the third lens group G3 required, for a displacement $\delta$ of the object point relative to the third lens group G3, in order to maintain the object point constant relative to the fourth lens group G4.

FIG. 9 shows the positions of the lens groups at the wide angle end, and, said lens groups axially move along the zoom trajectories indicated by arrows in FIG. 3, at the refractive power varying operation to the telescopic end.

Following Table 5 shows the parameters of the example 5, wherein f stands for the focal length, FNO for the F-number, $2\omega$ for the image angle and Bf for the back focus. The refractive index and Abbe's number are given by values for the d-line ($\lambda$=587.6 nm).

TABLE 5

$f = 38.8–110.5$
$FNO = 4.1–8.2$
$2\omega = 57.8–21.4°$

| Face No. | Radius of Curvature | Face Distance | Ref. Index | Abbe's Number |
|---|---|---|---|---|
| 1 | 38.7385 | 1.633 | 1.80518 | 25.35 |
| 2 | 21.3035 | 0.628 | | |
| 3 | 21.0319 | 3.893 | 1.62280 | 57.03 |
| 4 | −341.0792 | (d4 = variable) | | |
| 5 | −51.9442 | 1.256 | 1.77279 | 49.45 |
| 6 | 17.0448 | 2.888 | 1.75520 | 27.61 |
| 7 | −133.8779 | (d7 = variable) | | |
| 8 | −19.9515 | 1.256 | 1.77279 | 49.45 |
| 9 | −151.1844 | (d9 = variable) | | |
| 10 | ∞ | 1.884 | (stop) | |
| 11 | 89.4983 | 2.009 | 1.62041 | 60.14 |
| 12 | −28.8833 | 0.126 | | |
| 13 | 44.5675 | 3.391 | 1.51860 | 69.98 |
| 14 | −11.5129 | 1.507 | 1.80518 | 25.35 |
| 15 | −20.3434 | (d15 = variable) | | |
| 16 | −54.3667 | 3.140 | 1.80518 | 25.35 |
| 17 | −21.7045 | 0.628 | | |
| 18 | −48.6549 | 1.507 | 1.84042 | 43.35 |
| 19 | −141.6808 | 4.144 | | |
| 20 | −14.7784 | 1.507 | 1.77279 | 49.45 |
| 21 | −280.6453 | (Bf) | | |

(Variable distances in lens movement)

| f | 38.7626 | 110.4625 |
|---|---|---|
| d4 | 1.9829 | 15.1690 |
| d7 | 3.7630 | 6.2747 |
| d9 | 4.1545 | 1.6429 |
| d15 | 14.9653 | 1.7792 |

TABLE 5-continued

| Bf | 10.0151 | 51.8560 |
|---|---|---|
| | (Amount of focusing movement of 3rd lens group G3 at magnification 1/40) | |

| | f | 38.7626 | 110.4625 |
|---|---|---|---|
| Amount of movement | | −1.0496 | −1.1477 |

Direction of light is taken as +.
(Conditional values)

(7) |f2|/f1 = 1.471
(8) (f2 − f3) (f2 + f3) = 0.537
(9) 1/β2w = 0.355
(10) β3t = −0.461
(11) ΔBf/(ft − fw) = −0.584
(12) ro/ri = 0.132

Example 6

Figure 10:
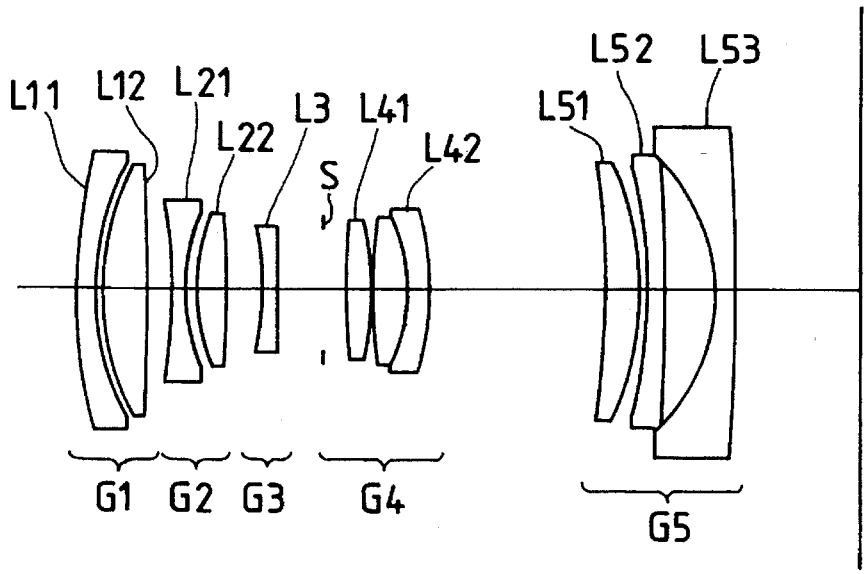
FIG. 10 is a view showing the configuration of a 6th example of the zoom lens of the present invention.

FIG. 10 shows the configuration of a zoom lens constituting a sixth example of the present invention.

The illustrated zoom lens is composed, in the order from the object side, of a first lens group G1 consisting of a negative meniscus lens component L11 convex to the object side and a biconvex lens component L12, a second lens group G2 consisting of a biconcave lens component L21 and a biconvex lens component L22, a third lens group G3 consisting of a negative meniscus lens L3 concave to the object side, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side and a negative lens component L53 convex to the image side.

A stop S is positioned between the third lens group G3 and the fourth lens group G4, and moves integrally with the fourth lens group G4 at the refractive power varying operation from the wide angle end to the telescopic end.

FIG. 10 shows the positions of the lens groups at the wide angle end, and, said lens groups axially move along the zoom trajectories indicated by arrows in FIG. 3, at the refractive power varying operation to the telescopic end.

The zoom lens of the example 6 is similar to that of the example 5, but is different in the refractive power and shape of the lens groups.

Following Table 6 shows the parameters of the example 6, wherein f stands for the focal length, FNO for the F-number, 2ω for the image angle and Bf for the back focus. The refractive index and Abbe's number are given by values for the d-line (λ=587.6 nm).

TABLE 6 f = 38.8–110.5
FNO = 4.2–8.2
2ω = 58.2–21.6°

| Face No. | Radius of Curvature | Face Distance | Ref. Index | Abbe's Number |
|---|---|---|---|---|
| 1 | 36.4996 | 1.633 | 1.80518 | 25.35 |
| 2 | 20.0124 | 0.628 | | |
| 3 | 19.8728 | 3.893 | 1.62280 | 57.03 |
| 4 | −287.9579 | (d4 = variable) | | |
| 5 | −40.3757 | 1.256 | 1.77279 | 49.45 |
| 6 | 16.5217 | 1.005 | | |
| 7 | 16.5098 | 2.135 | 1.75520 | 27.61 |
| 8 | −106.6373 | (d8 = variable) | | |
| 9 | −22.7367 | 1.256 | 1.77279 | 49.45 |
| 10 | −2175.3454 | (d10 = variable) | | |
| 11 | ∞ | 1.884 | (stop) | |
| 12 | 66.0846 | 2.009 | 1.62041 | 60.14 |
| 13 | −27.2670 | 0.126 | | |
| 14 | 45.6746 | 3.391 | 1.51860 | 69.98 |
| 15 | −11.8063 | 1.507 | 1.80518 | 25.35 |
| 16 | −22.9676 | (d16 = variable) | | |
| 17 | −71.1985 | 2.888 | 1.80518 | 25.35 |
| 18 | −22.6322 | 0.628 | | |
| 19 | −42.6267 | 1.507 | 1.84042 | 43.35 |
| 20 | −147.0292 | 4.144 | | |
| 21 | −14.5779 | 1.507 | 1.77279 | 49.45 |
| 22 | −212.5809 | (Bf) | | |

(Variable distances in lens movement)

| f | 38.7699 | 110.4757 |
|---|---|---|
| d4 | 1.9829 | 15.1690 |
| d8 | 3.1351 | 5.6468 |
| d10 | 3.7777 | 1.2661 |
| d16 | 14.9653 | 1.7792 |
| Bf | 10.4579 | 51.4709 |

(Amount of focusing movement of 3rd lens group G3 at magnification 1/40)

| f | 38.7699 | 110.4757 |
|---|---|---|
| Amount of movement | −0.9920 | −1.2412 |

Direction of light is taken as +.
(Conditional values)

(7) |f2|/f1 = 1.689
(8) (f2 − f3) (f2 + f3) = 0.566
(9) 1/β2w = 0.384
(10) β3t = −0.572
(11) ΔBf/(ft − fw) = −0.572
(12) ro/ri = 0.011

Example 7

Figure 11:
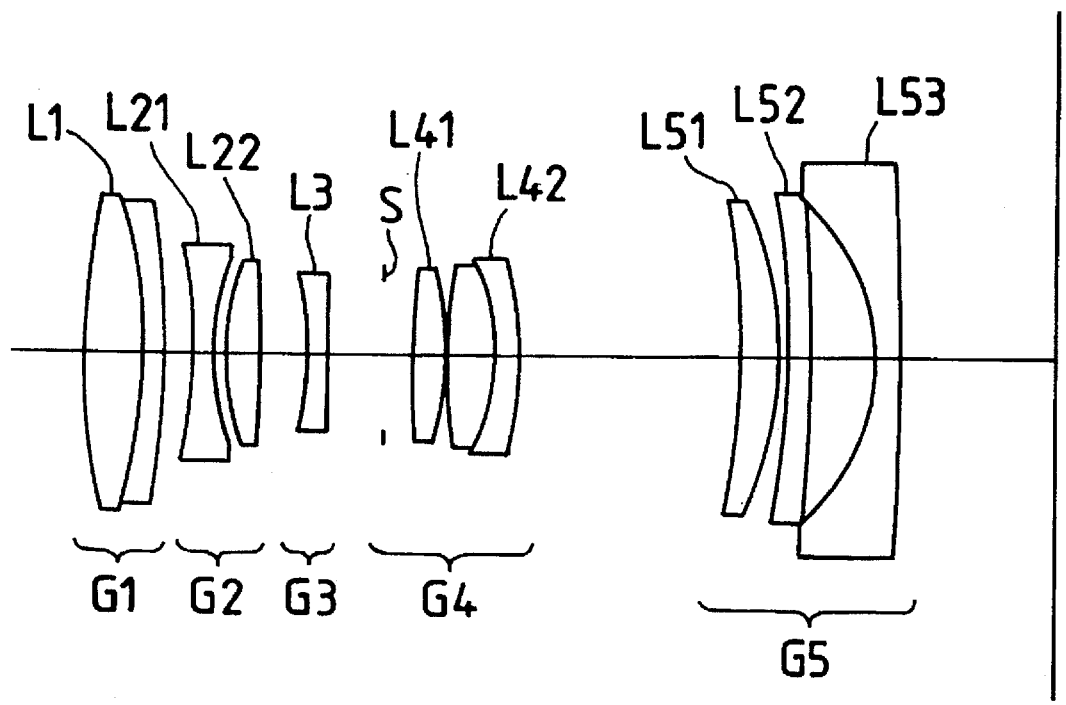
FIG. 11 is a view showing the configuration of a 6th example of the zoom lens of the present invention.

FIG. 11 shows the configuration of a zoom lens constituting a seventh example of the present invention.

The illustrated zoom lens is composed, in the order from the object side, of a first lens group G1 consisting of an adhered positive lens component L1 having an adhered face concave to the object side, a second lens group G2 consisting of a biconcave lens component L21 and a biconvex lens component L22, a third lens group G3 consisting of a negative meniscus lens L3 concave to the object side, a fourth lens group G4 consisting of a biconvex lens component L41 and an adhered positive lens component L42 having an adhered face convex to the image side, and a fifth lens group G5 consisting of a positive meniscus lens component L51 convex to the image side, a negative lens component L52 concave to the object side and a negative lens component L53 convex to the image side.

A stop S is positioned between the third lens group G3 and the fourth lens group G4, and moves integrally with the fourth lens group G4 at the refractive power varying operation from the wide angle end to the telescopic end.

FIG. 11 shows the positions of the lens groups at the wide angle end, and, said lens groups axially move along the zoom trajectories shown by arrows in FIG. 3, at the refractive power varying operation to the telescopic end.

The zoom lens of the example 7 is similar to that of the example 5 in configuration, but is different in the refractive power and shape of the lens groups.

Following Table 7 shows the parameters of the example 7, wherein f stands for the focal length, FNO for the F-number, 2ω for the image angle and Bf for the back focus. The refractive index and Abbe's number are given by values for the d-line (λ=587.6 nm).

TABLE 7 f = 38.8–110.5
FNO = 4.2–8.2
2ω = 58.0–21.4°

| Face No. | Radius of Curvature | Face Distance | Ref. Index | Abbe's Number |
|---|---|---|---|---|
| 1 | 44.2231 | 3.893 | 1.51860 | 69.98 |
| 2 | −35.3554 | 1.381 | 1.86074 | 23.01 |
| 3 | −60.7220 | (d3 = variable) | | |
| 4 | −33.6215 | 1.256 | 1.77279 | 49.45 |
| 5 | 17.8851 | 1.005 | | |
| 6 | 17.4200 | 2.135 | 1.75520 | 27.61 |
| 7 | −99.3335 | (d7 = variable) | | |
| 8 | −25.5918 | 1.256 | 1.77279 | 49.45 |
| 9 | 1482.1175 | (d9 = variable) | | |
| 10 | ∞ | 1.884 | (stop) | |
| 11 | 61.3242 | 2.009 | 1.62041 | 60.14 |
| 12 | −28.1749 | 0.126 | | |
| 13 | 42.1637 | 3.391 | 1.51860 | 69.98 |
| 14 | −12.3414 | 1.507 | 1.80518 | 25.35 |
| 15 | −24.9531 | (d15 = variable) | | |
| 16 | −53.1732 | 2.888 | 1.80518 | 25.35 |
| 17 | −22.2089 | 0.628 | | |
| 18 | −50.8223 | 1.507 | 1.84042 | 43.35 |
| 19 | −117.1486 | 4.144 | | |
| 20 | −14.3806 | 1.507 | 1.77279 | 49.45 |
| 21 | −295.7190 | (Bf) | | |

(Variable distances in lens movement)

| | | |
|---|---|---|
| f | 38.7825 | 110.5314 |
| d3 | 1.9829 | 15.1690 |
| d7 | 3.1351 | 5.6468 |
| d9 | 3.7777 | 1.2661 |
| d15 | 14.9653 | 1.7992 |
| Bf | 10.7105 | 52.4010 |

(Amount of focusing movement of 3rd lens group G3 at magnification 1/40)

| | | |
|---|---|---|
| f | 38.7825 | 110.5314 |
| Amount of movement | −0.9888 | −1.1478 |

Direction of light is taken as +.
(Conditional values)

(7) |f2|/f1 = 1.397
(8) (f2 − f3) (f2 + f3) = 0.455
(9) 1/β2w = 0.262
(10) β3t = −0.432
(11) ΔBf/(ft − fw) = −0.581
(12) ro/ri = −0.017

In the present invention, an aspherical face may be introduced into one of the lens faces in order to attain higher imaging characteristics or to simplify the configuration.

It is also possible to suitably shift one or more of the lens groups in a direction substantially perpendicular to the optical axis, in order to correct the variation in the image position, resulting for example from vibration of hand, thereby achieving so-called antivibration effect.

It is furthermore possible to obtain improved imaging characteristics for the objects at a large distance to a short distance, by moving, at the focusing operation, the third lens group G3 by an amount different from the moving amounts of other lens groups.

Having described specific embodiments of the present invention, it is to be understood that any variations will occur to those skilled in the art within the scope of the appended claims.

What is claimed is:

1. A zoom lens comprising, in the order from the object side, a first lens group having a positive refractive power, a second lens group having a negative refractive power, a third lens group having a negative refractive power, a fourth lens group having a positive refractive power and a fifth lens group having a negative refractive power, in which, at a refractive power varying operation from the wide angle end to the telescopic end, at least said first and fifth lens groups move to the object side, the air gaps between said first and second lens groups and between said second and third lens groups increase while the air gap between said fourth and fifth lens groups decreases, wherein:

a condition 0.4<ΔBf/(ft−fw)<0.8 is satisfied, in which ΔBf is the amount of movement along the optical axis of said fifth lens group at the refractive power varying operation from the wide angle end to the telescopic end, fw is the focal length of the entire lens system at the wide angle end, and ft is the focal length of the entire lens system at the telescopic end.

2. A zoom lens according to claim 1, further satisfying conditions:

0.6≦|f2|/f1<2.5

0.1<(d2,3t−d2,3w)/(d4,5w−d4,5t)<0.8 wherein f1 and f2 are focal lengths respectively of said first and second lens groups, d2,3w and d2,3t are axial air gaps between said second and third lens groups respectively at the wide angle end and at the telescopic end, and d4,5w and d4,5t are axial air gaps between said fourth and fifth lens groups respectively at the wide angle end and at the telescopic end.

3. A zoom lens according to claim 2, further satisfying conditions:

0.8<f1/(fw·ft)$^{1/2}$<1.4

−0.4<(f2−f3)/(f2+f3)<0.8

0.1<f5/f2<0.7 wherein f1, f2, f3 and f5 are focal lengths respectively of said first, second, third and fifth lens group, and fw and ft are focal lengths of the entire lens system respectively at the wide angle end and at the telescopic end.

4. A zoom lens according to claim 3, wherein said fifth lens group includes at least a positive meniscus lens concave to the object side and at least a negative lens concave to the object side.

5. A zoom lens according to claim 4, wherein said first and fifth lens groups are integrally moved at the refractive power varying operation from the wide angle end to the telescopic end.

6. A zoom lens according to claim 5, wherein said second and fourth lens groups are integrally moved at the refractive power varying operation from the wide angle end to the telescopic end.

7. A zoom lens according to claim 6, further comprising a stop at the approximate center of the entire lens system.

8. A zoom lens comprising, in the order from the object side, a first lens group having a positive refractive power, a second lens group having a negative refractive power, a third lens group having a negative refractive power, a fourth lens group having a positive refractive power and a fifth lens group having a negative refractive power, in which, at a refractive power varying operation from the wide angle end to the telescopic end, at least said first and fifth lens groups move to the object side, the air gaps between said first and second lens groups and between said third and fourth lens groups increase while the air gap between said fourth and fifth lens groups decreases, wherein:

said third lens group is moved toward the object side at the focusing operation from a larger object distance to a smaller object distance.

9. A zoom lens according to claim 8, further satisfying conditions:

$$1<|f2|/f1<3$$

$$0.2<(f2-f3)/(f2+f3)<0.8$$

wherein f1, f2 and f3 are focal lengths respectively of said first, second and third lens groups.

10. A zoom lens according to claim 9, further satisfying conditions:

$$-0.3<1/\beta 2w<0.5$$

$$-0.7<\beta 3t<0.3$$

wherein $\beta 2w$ is the imaging magnification of said second lens group at the wide angle end, and $\beta 3t$ is the imaging magnification of said third lens group at the telescopic end.

11. A zoom lens according to claim 10, further satisfying a condition:

$$0.4<\Delta Bf/(ft-fw)<0.8$$

wherein $\Delta Bf$ is the amount of axial movement of said fifth lens group at the refractive power varying operation from the wide angle end to the telescopic end, and fw and ft are focal lengths of the entire lens system respectively at the wide angle end and at the telescopic end.

12. A zoom lens according to claim 11, wherein a lens face of said third lens group closest to the object side is concave to the object side, and further satisfying a condition:

$$-0.4<ro/ri<0.5$$

wherein ro and ri are radii of curvature of lens faces, respectively closest to the object side and to the image side, in said third lens group.

13. A zoom lens according to claim 12, wherein said first and fifth lens groups are moved integrally at the refractive power varying operation from the wide angle end to the telescopic end.

14. A zoom lens according to claim 13, wherein said second and fourth lens groups are moved integrally at the refractive power varying operation from the wide angle end to the telescopic end.

15. A zoom lens according to claim 8, further satisfying conditions:

$$-0.3<1/\beta 2w<0.5$$

$$-0.7<\beta 3t<0.3$$

wherein $\beta 2w$ is the imaging magnification of said second lens group at the wide angle end, and $\beta 3t$ is the imaging magnification of said third lens group at the telescopic end.

* * * * *